(12) United States Patent
Willson, Jr. et al.

(10) Patent No.: US 7,225,217 B2
(45) Date of Patent: May 29, 2007

(54) LOW-POWER BOOTH-ENCODED ARRAY MULTIPLIER

(75) Inventors: Alan N. Willson, Jr., Pasadena, CA (US); Zhan Yu, Sunnyvale, CA (US); Larry S. Wasserman, Grenada Hills, CA (US)

(73) Assignee: The Regents of the University of California, Oakland, CA (US)

( * ) Notice: Subject to any disclaimer, the term of this patent is extended or adjusted under 35 U.S.C. 154(b) by 707 days.

(21) Appl. No.: 10/268,602

(22) Filed: Oct. 9, 2002

(65) Prior Publication Data

US 2003/0120695 A1 Jun. 26, 2003

Related U.S. Application Data

(60) Provisional application No. 60/328,365, filed on Oct. 9, 2001.

(51) Int. Cl.
G06F 7/52 (2006.01)
(52) U.S. Cl. ..................................... 708/630
(58) Field of Classification Search ................ 708/630
See application file for complete search history.

(56) References Cited

U.S. PATENT DOCUMENTS

| | | | | |
|---|---|---|---|---|
| 5,070,471 A | * | 12/1991 | Dao-Trong et al. | 708/630 |
| 5,818,743 A | * | 10/1998 | Lee et al. | 708/628 |
| 5,867,415 A | * | 2/1999 | Makino | 708/629 |
| 5,889,691 A | * | 3/1999 | Gatherer et al. | 708/627 |
| 6,021,424 A | * | 2/2000 | Chu | 708/630 |
| 6,029,187 A | * | 2/2000 | Verbauwhede | 708/625 |

OTHER PUBLICATIONS

C.J. Nicol and P. Larsson, "Low Power Multiplication For FIR Filters," Proceedings of International Symposium On Low Power Electronics and Design, Aug. 1997, pp. 76-79.
L.K. Tan, "High Performance Multiplier And Adder Compilers," M.S. thesis, UCLA, 1992.
M.D. Ercegovac and T. Lang, "Fast Multiplication Without Carry-Propagate Addition," IEEE Transactions on Computers, vol. 39, Nov. 1990, pp. 1385-1390.
Qing Wu, M. Pedram, and Xunwei Wu, "A Note On The Relationship Between Signal Probability And Switching Activity," Proceedings Asia and South Pacific Design Automation Conference, 1997, pp. 117-120.
K.-Y. Knoo, Z. Yu and Ax Willson Jr. "Improved Booth-Encoding For Low-Power Multipliers," Proceedings of the IEEE Inernational Symposium on Circuits and Systems, May 1999, pp. 62-65.
A.D. Booth, "A Signed Binary Multiplication Technique," Quarterly Journal of Mechanics and Applied Mathematics, vol. 4(2), pp. 236-240, 1951.

(Continued)

Primary Examiner—D. H. Malzahn
(74) Attorney, Agent, or Firm—John P. O'Banion

(57) ABSTRACT

An enhanced Booth-encoded adder-array multiplier where the low transition probability partial-products are generated and the adder array has been reorganized to reduce power dissipation when the Booth-encoded input has a large dynamic range. The architecture does not require extra circuits or routing overhead. Power dissipation is reduced by ordering the sequence of partial-product additions such that an increasing sequence of "transition probabilities" is encountered.

49 Claims, 3 Drawing Sheets

OTHER PUBLICATIONS

G. Keane, J. Spanier, and R. Woods, "The Impact Of Data Characteristics And Hardware Topoloty On Hardware Selection For Low Power DSP," Proceedings of International Symposium on Low Power Electronics and Design, pp. 94-96, Aug. 1998.

E. de Angel and E.E. Swartzlander Jr., "Low Power Parallel Multipliers," VLSI Signal Processing, IX, pp. 199-208, Oct. 1996.

* cited by examiner

LOW-POWER BOOTH-ENCODED ARRAY MULTIPLIER

CROSS-REFERENCE TO RELATED APPLICATIONS

This application claims priority from U.S. provisional application Ser. No. 60/328,365 filed on Oct. 9, 2001, incorporated herein by reference.

STATEMENT REGARDING FEDERALLY SPONSORED RESEARCH OR DEVELOPMENT

This invention was made with Government support under Grant No. MIP-9632698, awarded by the National Science Foundation. The Government has certain rights in this invention.

REFERENCE TO A COMPUTER PROGRAM APPENDIX

Not Applicable

BACKGROUND OF THE INVENTION

1. Field of the Invention

The present invention pertains generally to array multipliers, and more particularly to a Booth-encoded array multiplier architecture wherein low transition probability partial-products are generated, and the adder array is re-arranged according to the partial-products' signal transition probabilities.

2. Description of the Background Art

Multiplication is a ubiquitous operation in digital signal processing (DSP) applications. The well-known modified Booth-encoding algorithm reduces the number of partial products that must be added and is widely used in VLSI implementations of multiplication. Referring to FIG. 1, a Booth-encoded multiplier 10 typically comprises the following elements: a Booth-encoder 12, a partial-product generator 14, a partial-product summation array 16, and a final carry-propagation adder 18.

The radix-4 Booth encoding algorithm is commonly used in DSP applications. For multiplication XY, the radix-4 Booth-encoding algorithm encodes an N-bit two's complement number Y, one bit-pair at a time, into a set of signed-digits $$\left(S_0, S_{\frac{N}{2}-1}\right)$$

according to Table 1. In FIG. 1, $S_0$ is the least significant digit (LSD) and $$S_{\frac{N}{2}-1}$$

is the most-significant digit (MSD). To reduce the switching activity, and hence the power dissipation, in the partial-product generators and the adders, it is understood to be preferable to encode both a string of zeros and a string of ones as +0, as indicated by the bold +0 entries in Table 1. We define such a Booth-encoding method as "+0 Booth-encoding". See, for example, C. J. Nicol and P. Larsson, "Low power multiplication for FIR filters," in Proceedings of International Symposium on Low Power Electronics and Design, August 1997, pp. 76–79, incorporated herein by reference.

The partial-product generator 14 produces a partial-product $Q_i$ (generated using a simple shift and complement) according to multiplicand X and a signed-digit $S_i$. In FIG. 1, $Q_0$ is the LSD partial-product and it has the shortest word-length.

Referring to FIG. 2, as an example, a "standard" 8×8 Booth-encoded carry-save array multiplier 50 is shown. As used herein, the term "standard" means a conventional array multiplier structure with or without Booth-encoding wherein partial-products are added sequentially from the LSD partial-product to the MSD partial-product. By way of example, and not of limitation, FIG. 2 shows a "standard" array multiplier of the carry-save type. A standard carry-save array is a regular structure in which the partial-products are added together sequentially, with increasing word-length, starting with the LSD partial-product $Q_0$. In other words, a standard array multiplier adds the partial-products starting with the shorter word-lengths. Note that the sign-extensions of the two's complement numbers are taken care of by a compensation vector added in the adder array. See, for example, L. K. Tan, "High performance multiplier and adder compilers," M.S. thesis, UCLA, 1992, incorporated herein by reference. Other partial-product summation techniques can be employed in a manner that will be compatible with the present invention. In addition to carry-save adders, for example, the use of 4-to-2 compressors and dual-carry-save arrays can be employed, as will be evident to one skilled in the art.

As can be seen, the well-known modified Booth-encoding algorithm reduces the number of partial-products and is widely used in multipliers for DSP applications. The use of +0 Booth-encoding can reduce the transition probability of the partial-products. However, the switching of the partial products causes signal transitions in the partial-product adder array, and spurious transitions and logic races that flow through the adder array are major sources of power dissipation in multipliers. Accordingly, there is a need for an array configuration where unnecessary switching activity in the array is reduced.

BRIEF SUMMARY OF THE INVENTION

In many DSP applications, the magnitude of a digital signal does not always occupy the entire extent of its word-length. For a two's complement number Y with small-magnitude, its most-significant-bits (MSBs) are strings of zeros or ones, which are Booth-encoded as +0. This implies that the corresponding most-significant-digit (MSD) partial-products have a high probability of being zero and a low switching probability. However, referring to the standard 8×8 Booth-encoded carry-save array multiplier 50 in FIG. 2, even if $Q_2$ and $Q_3$ are zero, the second and the third adder rows will be switching because of the signal transitions propagating from the first adder row. These transitions are redundant since they are simply computing an addition of zero.

In accordance with the present invention, the adder array in an array multiplier should be configured according to a probabilistic property of the partial-products, so that the switching activity in the array is reduced. In other words, the partial-products are added according to their transition probabilities. This "reorganized" partial-product addition arrangement has all the advantages of a traditional adder array but with reduced power dissipation. The architecture of the present invention recognizes a useful feature of the signed-digit encoding property of the +0 Booth-encoding algorithm and uses it to exploit the high dynamic range property typical of many signals in DSP applications. Various addition operations and styles can be employed in the present invention, including but not limited to carry-save adders, 4-to-2 compressors, dual-carry-save arrays, and tree-style adder arrays.

By way of example, and not of limitation, for DSP applications a carry-save array structure according to the present invention is configured to add the partial-products sequentially starting with the MSD partial-product (e.g., see FIG. 3). For example, in the present invention, if $Q_2$ and $Q_3$ are zero, the first adder row will have no signal transition whatsoever. This structure is counterintuitive because the MSD partial-products have a longer word-length and it would appear that extra hardware would be needed. However, by reconfiguring a few adder cells and changing certain local connections (e.g., adders 104, 106 in FIG. 3), a structure such as shown in FIG. 3 can produce the same output as the standard carry-save adder array shown in FIG. 2 without requiring extra hardware. Such an adder array structure preserves the regularity and locality of a standard carry-save array, and has approximately the same complexity and delay, but with reduced power dissipation. We emphasize that the same sum is obtained by our MSD-first partial-product addition technique example in FIG. 3 as using a standard carry-save adder array in FIG. 2. For other purposes, other types of MSD-first computations have been advocated. In M. D. Ercegovac and T. Lang, "Fast multiplication without carry-propagate addition," IEEE Transactions on Computers, vol. 39, November 1990, pp 1385–1390, incorporated herein by reference, a different type of MSD-first computation is described. It obtains a different result; an error is included in the result. Our method makes no such error. Also notice that the prior art is limited to sign-magnitude signal representation input and output, while the presented invention discusses the arithmetic under two's complement numbers. When we refer to a computation wherein partial-products are added starting with a most-significant digit (MSD) partial-product, we define that to mean the type of MSD-first computation described in the present invention, not any of the other types that might have been conceived elsewhere. Our method, in particular, yields the same result, exactly, as would be obtained by a conventional LSD-first approach. It does so, however, while dissipating less power.

An advantage of an adder array configured according to the present invention is that its organization opposes the carry-propagation direction. Therefore, few signals need to propagate through the entire adder array. Another advantage is that such a structure reduces the number of long signal paths and hence reduces the switching activity in the adder array. Further advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

The power dissipation of a high-speed CMOS circuit is dominated by the dynamic switching power, which is proportional to the transition probability in the circuit. For a signal s we denote p(s) as the probability of s being non-zero and $p_A(s)$ as its transition probability. See, Qing Wu, M. Pedram, and Xunwei Wu, "A note on the relationship between signal probability and switching activity", in Proc. Asia and South Pacific Design Automation Conf., 1997, pp. 117–120, incorporated herein by reference. For random binary signals, $$p_A(s)=2p(s)(1-p(s)).$$

Since $p_A(s)$ achieves its maximum at p(s)=0.5, $p_A(s)$ is reduced if p(s) is skewed away from 0.5. For p(s)≦0.5, we seek to reduce p(s).

A transition at a circuit node may cause glitches in the combinatorial circuits fed by the node. The longer the logic depth, the more the capacitance that is affected due to glitching. To reduce the spurious transitions, it is desirable to assign a signal that has high switching probability to circuits having short logic depth. The switching activity in an adder array is related to the character of its inputs, the partial products. This relationship forms the intuition behind the proposed structure; it is reflected in two aspects as follows:

First, the switching of a partial-product causes spurious transitions and logic races that flow through the adder array. We seek to assign those partial-products having high switching probability a short signal path. In a carry-save array multiplier, for example, the partial-product first added affects a long logic path in the adder array. Therefore, it is desirable that this partial-product have a low switching probability. This leads to a carry-save array structure that adds the partial-products sequentially in the order of non-decreasing $p_A(Q_i)$.

Figure 1:
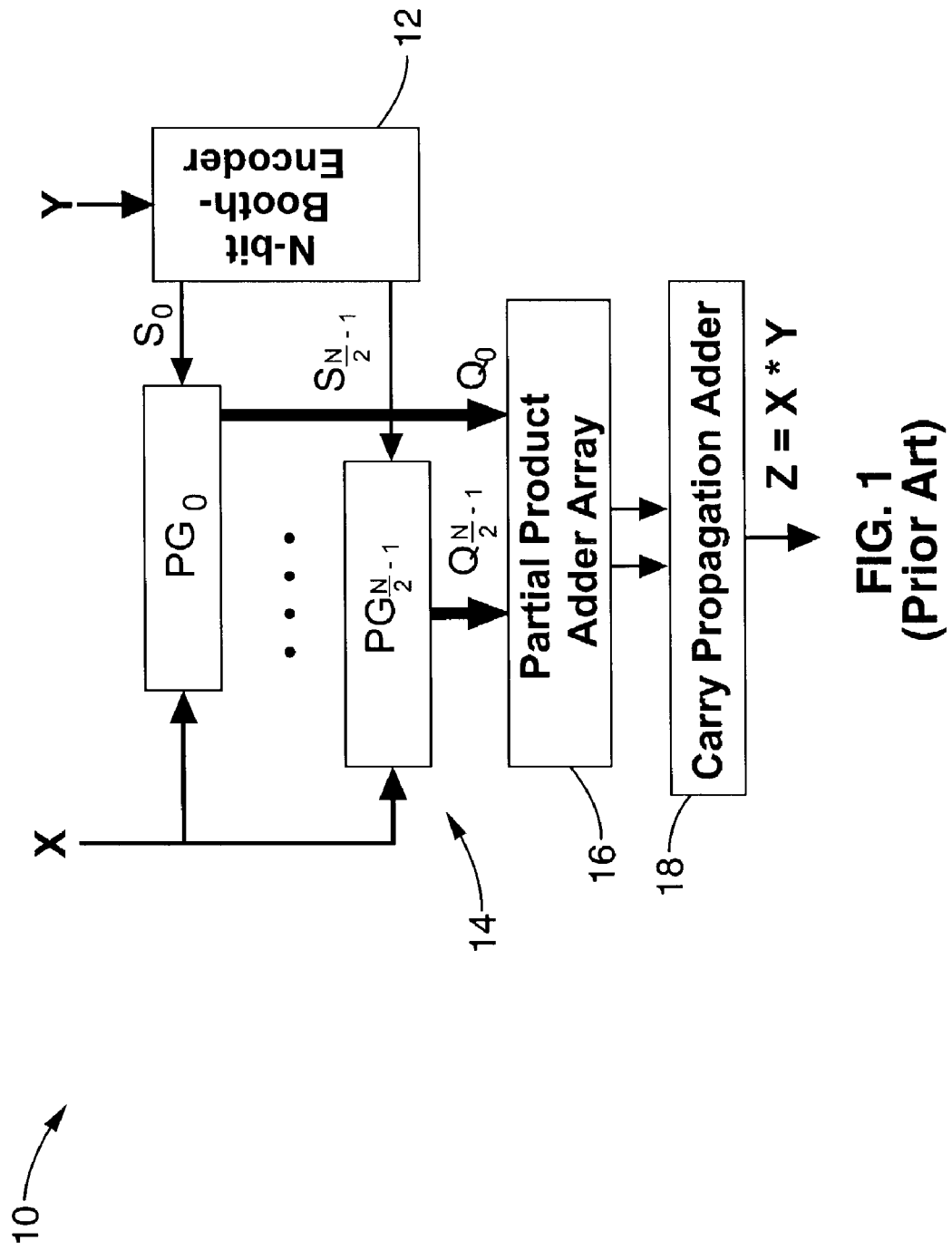
FIG. 1 is a schematic diagram showing the general architecture of a standard Booth-encoded multiplier.
Figure 2:
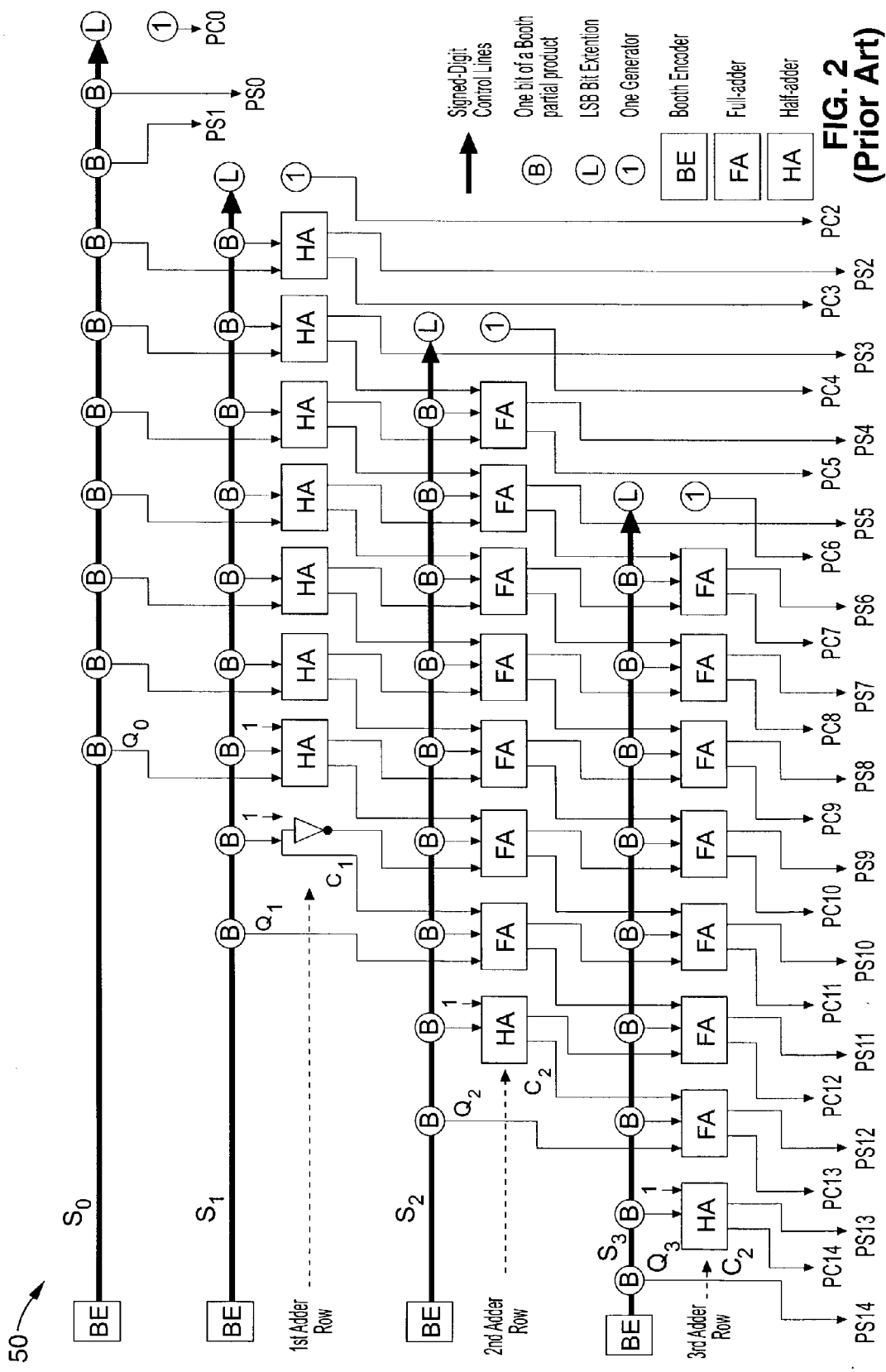
FIG. 2 is a schematic diagram showing the architecture of a standard 8×8 Booth-encoded carry-save array multiplier.

Second, the one probability of partial-products affects the transition probability in the adder array. Those skilled in the art will recognize that the sum signals in the adder array have a one probability close to 0.5 and that the one probability of a carry signal is given by:

$$p(C_1)=p(Q_m)p(Q_n)$$

where $Q_m$ and $Q_n$ are the two partial-products added in the first adder row, and $$p(C_k)=0.5p(C_{k-1})+0.5p(Q_i), \text{ for } k>1,$$

where $C_k$ is a carry output of the k-th adder row, and $Q_i$ is a partial-product added into the k-th adder row. (As shown in FIG. 2, the standard carry-save array adds the LSD partial-products first, and has i=k for k>1). In a carry-save array multiplier as shown in FIG. 2, the carry outputs of the first adder row have the longest signal path to the array output. Therefore, we should aggressively reduce the carry transition probability in the first few adder rows. Assuming the Booth-encoder input is a random binary signal, we have $p(Q_i)<0.5$ and $p(C_k)<0.5$. See, K.-Y. Knoo, Z. Yu and A. N. Willson, Jr. "Improved Booth-encoding for low-power multipliers," in Proceedings of the IEEE International Symposium on Circuits and Systems, May 1999, pp. 62–65, incorporated herein by reference. We can reduce the transition probability of the carry signal $p_\Delta(C_k)$ by reducing its one probability $p(C_k)$. To minimize $p(C_1)$, $Q_m$ and $Q_n$ should have the minimum $p(Q_m)$ and $p(Q_n)$. Since $p(C_2)=0.5p(C_1)+0.5p(Q_i)$, we should pick the minimum $p(Q_i)$ among the rest of the partial-products to minimize $p(C_2)$. Consequently, the partial-products should be added sequentially in the order of non-decreasing $p(Q_i)$, starting with the one that has the minimum $p(Q_i)$.

The above two observations give us a guideline on the ordering of the partial-product inputs in an adder array to reduce power dissipation.

It will be appreciated that, in many DSP applications, the magnitude of a digital signal does not always occupy the entire dynamic range of its wordlength. For example, the coefficients of an adaptive filter might vary over a large range during a training period, but only have a small magnitude once converged. Consider how such a signal property affects the partial-product statistics in a Booth-encoded multiplier. It is known that $$p(Q_i)=p(X)p(S_i)$$

and $p(Q_i)$ is reduced as $p(S_i)$ decreases. For a two's complement number that has a smaller magnitude than its wordlength, the most-significant bits (MSBs) are repeated sign-extension bits, which are strings of zeros or ones. These signal patterns are Booth-encoded as +0. This implies that the MSD of the Booth-encoder output has low $p(S_i)$ and the corresponding MSD partial-product has a low $p(Q_i)$.

For a random signal X, $p(X)=0.5$; therefore, $p(Q_i)=p(S_i)p(X)\leq 0.5$. Since $p(Q_i)\leq 0.5$, low $p(Q_i)$ implies reduced $p_\Delta(Q_i)$. Also, for a digital signal Y that varies in a small range, its MSBs switch less frequently, hence, so do the corresponding Booth signed-digit and the partial-product. Therefore, the MSD partial-products have low $p_\Delta(Q_i)$.

From the foregoing, we now know that the MSD partial-products have both small $p(Q_i)$ and $p_\Delta(Q_i)$. Combining this fact and our observations on the transition activity in a carry-save array, we conclude for purposes of the present invention that it is desirable to first (not last) add the MSD partial-products in a carry-save array for reduced circuit switching. Accordingly, the present invention comprises a carry-save array structure that adds the partial-products sequentially with decreasing wordlength, starting with the MSD partial-product.

Figure 3:
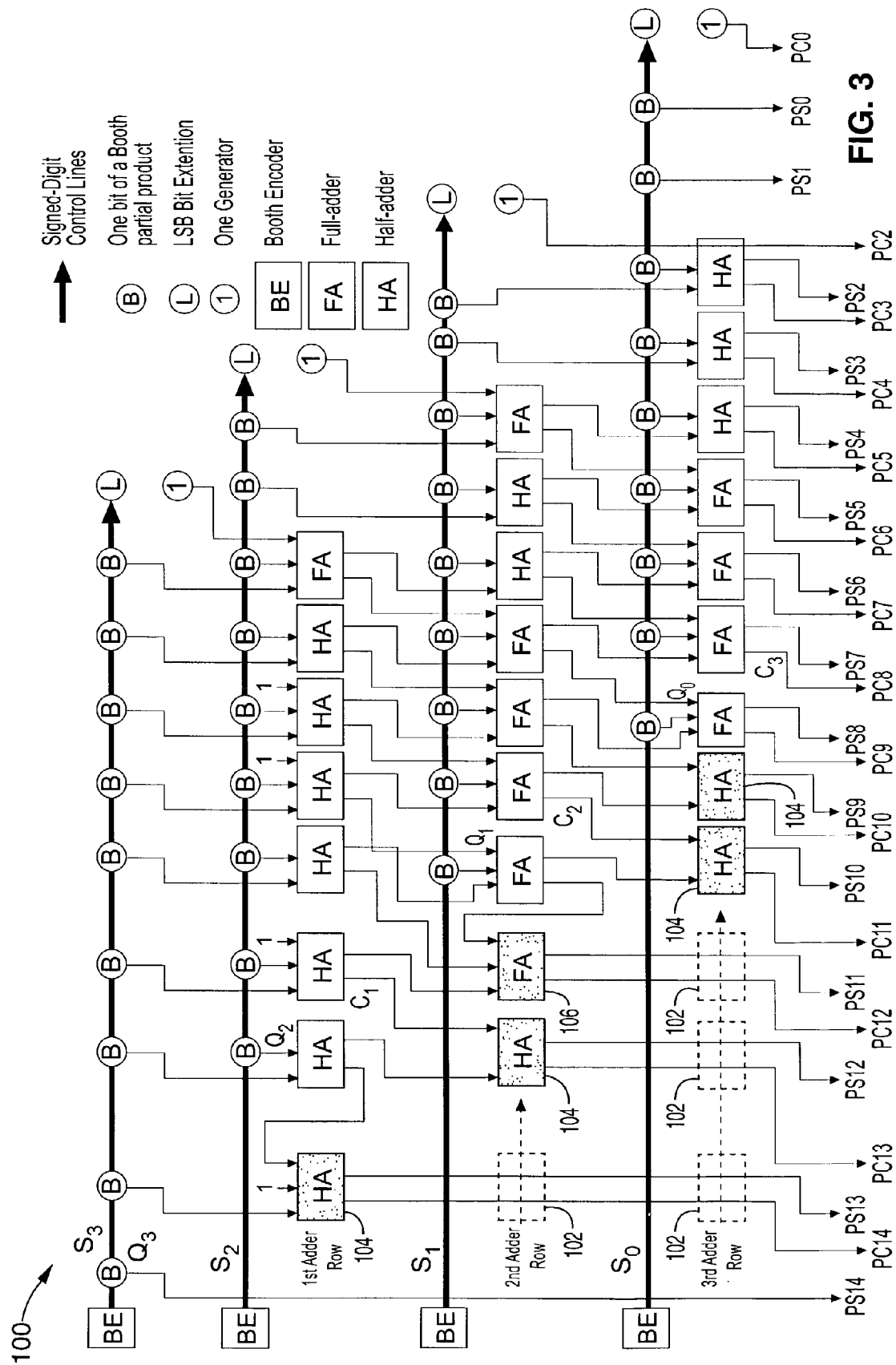
FIG. 3 is a schematic diagram showing the architecture of a low-power 8×8 Booth-encoded carry-save array multiplier according to the present invention.

Referring now to FIG. 3, an example of an embodiment of an 8×8 Booth-encoded carry-save array multiplier 100 according to the present invention is shown. As can be seen, the partial-products are added according to their transition probabilities. In the case of a DSP application and the use of Booth-encoding, the partial-products are added sequentially starting with the MSD partial-product which has a longer word-length than the LSD partial-product. Note that if $Q_2$ and $Q_3$ are zero, the first adder row will have no signal transition whatsoever. Such a structure is counterintuitive because the MSD partial-products have a longer word-length and it might seem that extra hardware (e.g., rows of half-adders (HA) where the dashed boxes 102 are shown in FIG. 3) would be needed at the MSB side of the adder array. However, the adder array only requires outputs of at most two signals per bit position with the final carry-propagation adder being used to sum up the carry-save signal. We can fulfill such a requirement by using a few adder cells (e.g., half-adders 104 and a full adder 106) at the MSB side of the adder array and by changing some local connections in the carry-save array without having to use adders where the dashed boxes 102 are shown. Such an adder array will produce the same output as the array in FIG. 2 and preserves the regularity and locality of a standard carry-save array. A careful examination of the structure of FIG. 3 shows that it has approximately the same complexity (11 FAs and 15 HAs) and approximately the same delay as the standard carry-save array shown in FIG. 2 (which employs 14 FAs and 9 HAs). It also yields the same sum.

Note that a carry-save array multiplier according to the present invention is particularly useful for XY when a Booth-encoded input Y is close to zero. In an application where Y is close to its maximum value, the low-power multiplier of the present invention can also be applied with some modifications. Assume Y is an N-bit number $\{y_{N-1}, \ldots, y_0\}$ and it represents integer values between $-2^{N-1}$ and $2^{N-1}-1$. Define $\overline{Y}=\{\overline{y}_{N-1}, \overline{y}_{N-2}, \ldots, \overline{y}_1, \overline{y}_0\}$ and we know that, for a two's complement number, $-Y=\overline{Y}+1$. Also define $\hat{Y}=\{y_{N-1}, \overline{y}_{N-2}, \ldots, \overline{y}_1, \overline{y}_0\}$ and we have $\hat{\overline{Y}}=\{\overline{y}_{N-1}, y_{N-2}, \ldots, y_1, y_0\}$. Now consider the following two cases:

(a) Y is positive and close to $2^{N-1}-1$. We can rewrite $Y=(2^{N-1}-1)-\hat{Y}$ where $\hat{Y}$ is a small positive number. The original multiplication XY becomes $$XY=(2^{N-1}-1)X-X\hat{Y}=2^{N-1}X-X(1+\hat{Y})=2^{N-1}X+X\hat{\overline{Y}},$$

and $2^{N-1}X$ is simply a shift of X, which can be accumulated after the multiplication (according to the present invention) that computes $X\hat{\overline{Y}}$ or merged with the multiplier's adder array.

(b) Y is negative and close to $-2^{N-1}$. We can rewrite $Y=(-2^{N-1}-1)-\hat{Y}$ where $\hat{Y}$ is a small negative number. Similarly, $$XY=(-2^{N-1}-1)X-X\hat{Y}=-2^{N-1}X-X(1+\hat{Y})=-2^{N-1}X+X\hat{\overline{Y}},$$

and again the multiplier of the present invention can be applied for low power.

We also observe that the present invention is not limited to the use of carry-save adder arrays. Other partial-product summation techniques can be applied, for example, the use of 4-to-2 compressors and dual-carry-save arrays. In all cases, for low power dissipation, the partial-products should be added in an order that causes increasing signal transition probabilities for successive additions, rather than being ordered in terms of increasing word-length as is usually the case for conventional methods. At the same time, the +0 Booth-encoding should be applied together with array re-arrangement for more power reduction.

EXAMPLE 1

Several multiplier circuits were implemented in a 0.5 μm technology using Synopsys Design Compiler™ for synthesis and Cadence™ for place and route. We used a set of well-characterized leaf-cells with state-dependent power dissipation, and the interconnect parasitic information was extracted from the layout. The circuits were simulated at a clock speed of 10 MHz in Verilog™, the toggle rates of all of the nodes were calculated, and the power dissipation was reported using Synopsys Design Power™. Our multiplier implementation did not include the final carry-propagation adder because its power characteristic has been well studied and it is not the focus of this invention.

We first simulated the power dissipation of the multipliers when the Booth-encoded input signal had a dynamic range smaller than its word-length. The other input of the multiplier was a random signal. The simulation results are summarized in Table 2 for a conventional multiplier (std.) and a multiplier according to the invention (inv.). As expected, more power savings are achieved when the input signal has a small magnitude. This corresponds to the case when the MSD partial-products are zero, and the first few adder rows in the proposed structure do not switch at all. (By contrast, all the adder cells in the standard carry-save array switch due to the transitions in the LSD partial-products). Table 2 shows that the invention actually has reduced power dissipation for signals of all dynamic ranges. Table 3 shows that the architecture of the present invention does not require extra circuits or routing overhead.

EXAMPLE 2

The invention was also applied in a multiplexed FIR filter running at a clock speed of 10 MHz. The filter coefficients were Booth-encoded and the other multiplier input was a random signal. The power dissipation for various multiplier sizes is summarized in Table 3 and, as can be seen, an over 18% power reduction has been achieved.

Accordingly, the present invention comprises a low-power array multiplier which is preferably Booth-encoded for many applications. Its architecture is suitable for DSP applications where one of the input signals has a large dynamic range. We take advantage of the encoding property of a Booth encoder and modify the standard adder array to reduce the total switching activity inside the array. As a result, power dissipation is reduced.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Booth-Encoding

| $Y_{2i+1}$ | $Y_{2i}$ | $Y_{2i-1}$ | $S_i$ |
|---|---|---|---|
| 0 | 0 | 0 | +0 |
| 0 | 0 | 1 | +1 |
| 0 | 1 | 0 | +1 |
| 0 | 1 | 1 | +2 |
| 1 | 0 | 0 | −2 |
| 1 | 0 | 1 | −1 |
| 1 | 1 | 0 | −1 |
| 1 | 1 | 1 | +0 |

TABLE 2

Power Comparisons

| Dynamic Range (bits) | 16 × 16 multiplier Power (mW) | | | 12 × 12 multiplier Power (mW) | | | 8 × 8 multiplier Power (mW) | | |
|---|---|---|---|---|---|---|---|---|---|
|  | Std. | Inv. | % | Std. | Inv. | % | Std. | Inv. | % |
| 16 | 16.62 | 16.21 | −2.5 |  |  |  |  |  |  |
| 15 | 16.47 | 15.86 | −3.7 |  |  |  |  |  |  |
| 14 | 15.77 | 14.44 | −8.5 |  |  |  |  |  |  |
| 13 | 15.41 | 14.00 | −9.1 |  |  |  |  |  |  |
| 12 | 14.27 | 12.38 | −13.3 | 7.38 | 7.34 | −0.5 |  |  |  |
| 11 | 13.95 | 11.86 | −15.0 | 7.28 | 7.15 | −1.8 |  |  |  |
| 10 | 12.81 | 10.01 | −21.8 | 6.87 | 6.31 | −8.3 |  |  |  |
| 9 | 12.10 | 9.16 | −24.2 | 6.53 | 5.92 | −9.4 |  |  |  |
| 8 | 10.66 | 7.26 | −31.9 | 5.87 | 4.95 | −15.6 | 2.36 | 2.33 | −1.3 |
| 7 | 10.16 | 6.80 | −33.1 | 5.59 | 4.64 | −17.0 | 2.29 | 2.23 | −2.6 |
| 6 | 8.36 | 5.19 | −37.9 | 4.71 | 3.50 | −25.7 | 2.03 | 1.84 | −9.3 |
| 5 | 7.81 | 4.67 | −40.2 | 4.39 | 3.12 | −28.8 | 1.89 | 1.67 | −11.8 |
| 4 | 6.21 | 3.32 | −46.6 | 3.49 | 2.13 | −39.0 | 1.49 | 1.22 | −18.1 |
| 3 | 5.33 | 2.84 | −46.7 | 2.98 | 1.78 | −40.4 | 1.26 | 1.01 | −19.9 |
| 2 | 3.50 | 1.87 | −46.4 | 1.92 | 1.14 | −40.6 | 0.82 | 0.62 | −24.7 |

TABLE 3

Area (mm$^2$) and Power (mW) Comparison

| Multiplier Size | Standard | | Invention | | Power Savings |
|---|---|---|---|---|---|
|  | Area | Power | Area | Power |  |
| 16 × 16 | 0.30 | 14.5 | 0.30 | 11.9 | 18.4% |
| 12 × 12 | 0.16 | 5.28 | 0.16 | 4.32 | 18.1% |
| 8 × 8 | 0.07 | 1.10 | 0.07 | 0.88 | 20.1% |

What is claimed is:

1. An array multiplier, comprising:
   a partial-product generator;
   an adder array configured for two's complement addition including a carry;
   said adder array is configured for adding partial products starting with the most significant digit (MSD) and for outputting both carry and save signals; and
   means for reducing power dissipation in said adder array, compared to a standard array multiplier, in response to adding partial-products based in an order of increasing signal transition probabilities for successive additions.

2. An array multiplier as recited in claim 1, wherein partial-products are added subsequent to encoding a first binary number for receipt within said partial-product generator which is configured to receive a second binary number.

3. An array multiplier as recited in claim 1:
wherein partial-products are added sequentially starting with a most significant digit (MSD) partial product; and
wherein the MSD partial-product has a longer wordlength than the LSD partial-product.

4. An array multiplier as recited in claim 1, wherein said means preserves the same output sum, regularity and locality of a standard array multiplier.

5. An array multiplier as recited in claim 1, wherein said array multiplier comprises a carry-save array multiplier having approximately the same complexity and delay as in a standard array multiplier.

6. An array multiplier as recited in claim 1, wherein circuit switching is reduced in relation to a standard array multiplier in response to ordering of transition probabilities.

7. An array multiplier as recited in claim 1:
wherein partial-products are added sequentially with decreasing wordlength starting with the MSD partial-product; and
wherein said adder array is configured with outputs of at most two signals per bit position.

8. An array multiplier as recited in claim 1, wherein said array multiplier is Booth-encoded.

9. An array multiplier as recited in claim 1, wherein said adder array is selected from the group of adder types consisting essentially of carry-save arrays, 4-to-2 compressors, and dual-carry-save arrays.

10. An array multiplier as recited in claim 1, further comprising means for carrying out a shift-and-add operation on the carry and save signals output from said adder array.

11. An array multiplier, comprising:
a partial-product generator;
an adder array configured for two's complement addition starting with the most significant digit, and for outputting both carry and save signals; and
means for reducing power dissipation in said adder array, in comparison with a standard adder array, by adding partial-products in an order of increasing signal transition probabilities.

12. An array multiplier as recited in claim 11:
wherein partial-products are added sequentially starting with the most significant digit (MSD) partial-product; and
wherein said adder array is configured with outputs of at most two signals per bit position.

13. An array multiplier as recited in claim 11, wherein power dissipation is reduced in relation to a standard array multiplier in response to reduced switching activity.

14. An array multiplier as recited in claim 11, wherein said means preserves the same output sum, regularity and locality of a standard array multiplier.

15. An array multiplier as recited in claim 11, wherein said array multiplier comprises a carry-save array multiplier having approximately the same complexity and delay as in a standard array multiplier.

16. An array multiplier as recited in claim 11, wherein circuit switching is reduced in relation to a standard array multiplier in response to ordering of transition probabilities.

17. An array multiplier as recited in claim 11, wherein said partial-products are added sequentially according to decreasing wordlength.

18. An array multiplier as recited in claim 11, wherein said array multiplier is Booth-encoded.

19. An array multiplier as recited in claim 11, wherein said adder array is selected from the group of adder types consisting essentially of carry-save adder arrays, 4-to-2 compressors, and dual-carry-save arrays.

20. An array multiplier as recited in claim 11:
further comprising a carry-propagate adder configured for carrying out a shift-and-add operation; and
wherein said adder array is configured with outputs of at most two signals per bit position received by said carry-propagate adder used to sum up the carry-save signal.

21. An array multiplier, comprising:
a partial-product generator;
an adder array configured to add two's complement partial-partial products starting with the most significant digit (MSD) in an order of increasing signal transition probabilities for successive additions and in response to both save and carry signals toward reducing circuit transitions over a conventional adder array which adds partial-products from the least significant digit (LSD);
wherein said adder array is configured with outputs of at most two signals per bit position;
wherein local connection within said adder array eliminates at least one adder in at least one row of said adder array in response to the reduced transition probabilities at the MSD side of the adder array; and
a carry-propagation adder circuit configured for converting said save and carry signals from said adder array into a result.

22. An array multiplier as recited in claim 21, wherein adding partial-products in response to increasing signal transition probabilities provides increased circuit power savings as the magnitude of input signals is reduced.

23. An array multiplier as recited in claim 21, wherein power dissipation is reduced in relation to a standard array multiplier in response to reduced switching activity.

24. An array multiplier as recited in claim 21, wherein said adder array preserves the same output sum, regularity and locality of a standard array multiplier.

25. An array multiplier as recited in claim 21, wherein said array multiplier comprises a carry-save array multiplier having approximately the same complexity and delay as in a standard array multiplier.

26. An array multiplier as recited in claim 21, wherein circuit switching is reduced in relation to a standard array multiplier in response to ordering of transition probabilities.

27. An array multiplier as recited in claim 21, wherein said partial-products are added sequentially according to decreasing wordlength.

28. An array multiplier as recited in claim 21, wherein said array multiplier is Booth-encoded.

29. An array multiplier as recited in claim 21, wherein said adder array is selected from the group of adder types consisting essentially of carry-save adder arrays, 4-to-2 compressors, and dual-carry-save arrays.

30. An array multiplier as recited in claim 21:
wherein said array multiplier is an MSD-first array multiplier which is Booth-encoded; and
wherein said Booth-encoding comprises +0 Booth encoding in which the most significant bits which are repeated as sign extension bits are encoded as +0 for a two's complement number having a smaller magnitude than its word length.

31. In an array multiplier having a partial product generator and an adder array, the improvement comprising:
adding partial-products starting with the most significant digit (MSD) in an order of increasing signal transition probabilities on successive additions and outputting carry and save signals; and wherein said adder array is configured for performing two's complement additions.

32. An improvement as recited in claim 31, wherein said adder array is configured for outputting at most two signals per bit position comprising a save signal and carry.

33. An improvement as recited in claim 31, wherein power dissipation is reduced in relation to a standard array multiplier in response to reduced switching activity.

34. An improvement as recited in claim 31, wherein said adder array configuration preserves the same output sum, regularity and locality of a standard array multiplier.

35. An improvement as recited in claim 31, wherein said array multiplier has approximately the same complexity and delay as in a standard array multiplier.

36. An improvement as recited in claim 31, wherein circuit switching is reduced in relation to a standard array multiplier in response to ordering of transition probabilities.

37. An improvement as recited in claim 31, wherein said partial-products are added sequentially according to decreasing wordlength.

38. An improvement as recited in claim 31:
wherein said array multiplier is an MSD-first array multiplier which is Booth-encoded; and
wherein said Booth-encoding comprises +0 Booth encoding in which the most significant bits which are repeated as sign extension bits are encoded as +0 for a two's complement number having a smaller magnitude than its word length.

39. An improvement as recited in claim 31, wherein said adder array is selected from the group of adder types consisting essentially of carry-save adder arrays, 4-to-2 compressors, and dual-carry-save arrays.

40. An improvement as recited in claim 31, further comprising means for carrying out a shift-and-add operation.

41. An array multiplier circuit, comprising:
a partial-product generator;
an adder array configured to add partial-products starting with the most significant digit (MSD) in an order of increasing signal transition probabilities;
wherein an output is generated from said adder array containing both carry and save information for each digit of the multiplier circuit; and
a carry-propagation adder configured for carrying out a shift-and-add operation on the saves and carries output from said adder array.

42. An array multiplier as recited in claim 41, wherein adding partial-products in response to increasing signal transition probabilities provides increased circuit power savings as the magnitude of input signals is reduced.

43. An array multiplier as recited in claim 41, wherein the output sum, regularity and locality of a standard array multiplier is preserved.

44. An array multiplier as recited in claim 41, wherein said array multiplier has approximately the same complexity and delay as in a standard array multiplier.

45. An array multiplier as recited in claim 41, wherein circuit switching is reduced in relation to a standard array multiplier.

46. An array multiplier as recited in claim 41, wherein partial-products are added sequentially with decreasing wordlength starting with the MSD partial-product.

47. An array multiplier as recited in claim 41:
wherein said array multiplier is an MSD-first array multiplier which is Booth-encoded; and
wherein said Booth-encoding comprises +0 Booth encoding in which the most significant bits which are repeated as sign extension bits are encoded as +0 for a two's complement number having a smaller magnitude than its word length.

48. An array multiplier as recited in claim 41, further comprising an adder array selected from the group of adder types consisting essentially of carry-save arrays, 4-to-2 compressors, and dual-carry-save arrays.

49. An array multiplier as recited in claim 41, further comprising means for carrying out a shift-and-add operation.

\* \* \* \* \*